United States Patent
Beart et al.

(10) Patent No.: US 7,518,337 B2
(45) Date of Patent: Apr. 14, 2009

(54) RETENTION OF INDUCTIVELY RECHARGEABLE DEVICES ON AN INDUCTIVE CHARGER

(75) Inventors: Pilgrim Giles William Beart, Harston (GB); Lily Ka-Lai Cheng, London (GB)

(73) Assignee: Access Business Group International LLC, Ada, MI (US)

( * ) Notice: Subject to any disclaimer, the term of this patent is extended or adjusted under 35 U.S.C. 154(b) by 0 days.

(21) Appl. No.: 10/529,394

(22) PCT Filed: Sep. 26, 2003

(86) PCT No.: PCT/GB03/04150

§ 371 (c)(1),
(2), (4) Date: Mar. 28, 2005

(87) PCT Pub. No.: WO2004/030176

PCT Pub. Date: Apr. 8, 2004

(65) Prior Publication Data

US 2006/0043927 A1   Mar. 2, 2006

(30) Foreign Application Priority Data

Sep. 27, 2002   (GB)   ................... 0222436.8

(51) Int. Cl.
*H02J 7/00* (2006.01)
(52) U.S. Cl. ...................... 320/108; 114/115
(58) Field of Classification Search .......... 320/108, 320/114, 115
See application file for complete search history.

(56) References Cited

U.S. PATENT DOCUMENTS

| 5,606,237 | A | | 2/1997 | Biasotti et al. |
| 5,959,433 | A | * | 9/1999 | Rohde .................. 320/108 |
| 6,014,008 | A | * | 1/2000 | Hartzell et al. ........... 320/106 |
| 6,027,225 | A | * | 2/2000 | Martin et al. ............ 362/183 |
| 6,489,745 | B1 | * | 12/2002 | Koreis ................... 320/108 |
| 6,803,744 | B1 | * | 10/2004 | Sabo ..................... 320/108 |
| 2001/0055207 | A1 | | 12/2001 | Barbeau et al. |
| 2003/0003971 | A1 | * | 1/2003 | Yamamoto ............... 455/573 |

FOREIGN PATENT DOCUMENTS

| EP | 0 817 351 | 7/1997 |
| GB | 1 082 070 | 6/1965 |
| GB | 2 314 470 | 12/1997 |
| GB | 2 330 461 | 4/1999 |
| GB | 2 389 720 | 12/2003 |
| JP | 2003-011734 | 1/2003 |

* cited by examiner

*Primary Examiner*—Akm E Ullah
*Assistant Examiner*—Richard V Muralidar
(74) *Attorney, Agent, or Firm*—Warner Norcross & Judd LLP

(57) ABSTRACT

There is disclosed a system and method for retaining portable rechargeable devices to recharging stations wherein one or other or both of the recharging station and the portable device are provided with connecting means adapted for temporary releasable connection of the two. This is particularly advantageous when used with recharging stations, which permit the device to be recharged in multiple places on the recharging station, providing a positive means of retaining the device. This is particularly advantageous if the recharging station is to be used in a mobile environment such as a car, or on a wall or ceiling.

6 Claims, 3 Drawing Sheets

RETENTION OF INDUCTIVELY RECHARGEABLE DEVICES ON AN INDUCTIVE CHARGER

FIELD OF THE INVENTION

This invention relates to a new system for temporary attachment of portable rechargeable devices to recharging stations, and a method of temporarily attaching portable rechargeable devices to their charging units.

BACKGROUND OF THE INVENTION

Today's portable rechargeable devices are typically recharged by temporarily connecting them to a recharger via a mating plug-in or clip-on connection. An example is the typical "floating wire" connection between a mains charger and a mobile phone (see FIG. 1).

The connection serves two purposes:
1) It electrically connects the device to its recharger, allowing transfer of power.
2) It mechanically connects the device to its recharger, in a way which retains it securely against forces from accidental knocks and the like, but is easily removable by the user. This mechanical connection thus allows recharging to continue reliably until the user physically breaks the connection, and in some cases may also keep the device conveniently available to the user. Examples of the latter include the recharging "cradle" for the Palm Pilot® and the drop-in "hands-free" car socket for a mobile phone.

Some of today's portable rechargeable devices are charged by a non-contact means, for example by inductive power transfer. An example is the Braun® electric toothbrush, where the toothbrush must be accurately located onto a spigot on the recharger, which retains it. However, the spigot serves only as a positioning means and no additional force is required to separate the toothbrush from the charger other than that required to lift the toothbrush against gravity.

But some of these non-contact charging means do not require the device and the recharger to be so precisely aligned. Such solutions may offer significant freedoms for the designer and for the user. For example the recharging means may be a laminar surface upon which a device can conveniently be placed, in any position and any orientation, as disclosed, for example, in the present applicant's UK patent application no. 01283175 of 27 Nov. 2001. This avoids the limitations of the positive mechanical connection (e.g. cradles, connectors, clips) required by other charging solutions, and so is more convenient to the user because it is easier to place a device casually anywhere on a surface than precisely to align it with a mechanical socket. Dispensing with the need for mechanical location may also allow other benefits, such as the ability simultaneously to recharge multiple units, and/or to recharge devices of different types on the same recharger.

However in some situations, the lack of positive mechanical retention of such a surface may be a disadvantage for users. For example:
  A flat recharging surface must be kept substantially horizontal to prevent devices from sliding off the surface. But this requirement may be inconvenient to the user—for example putting the surface on a desk may occupy otherwise-useful space. Freeing-up the surface so that it can be placed in any orientation would give the user much more flexibility to use otherwise-useless space—for example to mount the surface vertically on a wall, or even on the inside of a car roof.
  If a mobile recharging surface is likely to be subject to movement (e.g. a tabletop that may get knocked, or in a car, airplane or spacecraft), the devices may fall off.

Clearly, it would be convenient to remove these potential disadvantages whilst preserving the benefits of freedom of design and use of such surface-based charging systems.

SUMMARY OF THE INVENTION

According to a first aspect of the present invention there is provided a system for wireless powering or recharging of rechargeable devices, the system comprising a charging unit and a power receiving device, wherein one or other or both of the charging unit and the power receiving device is provided with connecting means adapted for temporary releasable connection of the power receiving device to the charging unit, the connecting means not being an electrical connection.

According to a second aspect of the invention, there is provided a system for wireless powering or recharging of rechargeable devices, the system comprising a charging unit and a power receiving device, wherein one or other or both of the charging unit and the power receiving device is provided with connecting means adapted for temporary releasable connection of the power receiving device to the charging unit in at least two positions and/or rotations of the device relative to the charging unit.

According to a third aspect of the invention, there is provided a charging unit adapted for wireless powering or recharging of a power receiving device, wherein the charging unit is provided with connecting means for temporary releasable connection of a power receiving device thereto, the connecting means not being an electrical connection.

According to a fourth aspect of the present invention, there is provided a power receiving device adapted for wireless powering or recharging by a charging unit, wherein the power receiving device is provided with connecting means for temporary releasable connection of a charging unit thereto, the connecting means not being an electrical connection.

According to a fifth aspect of the present invention, there is provided a method of wireless powering or recharging of a power-receiving device which comprises temporarily attaching the device to a charging unit, said method further comprising utilizing a releasable temporary connecting means attached to the charging unit and/or the device, wherein said connecting means is adapted to enable the charging unit and the device to be attached in one or more positions and/or orientations relative to each other, the connecting means not being an electrical connection.

Accordingly, embodiments of the present invention provides a system for powering or recharging rechargeable devices which has several advantages over the prior art.

Such a system is advantageous because it provides convenient retention of the device to the charging unit while still preserving the convenience of being able to simple drop or press the device against the charging unit, thus greatly expanding the number of usable places for the user to locate the charging unit.

It is to be appreciated that embodiments of the present invention are distinguished over existing systems and methods in that there is provided a combination of wireless power transfer and a temporary releasable connection. Ordinary wired power transfer systems generally incorporate a releasable physical connection such as a plug and socket with physical mating means, but these are provided in order to secure a good electrical connection. Ordinary wireless power transfer systems, on the other hand, do not incorporate physical, temporary releasable physical connections, since these have hitherto been seen as disadvantageous in a wireless system. For the avoidance of doubt, it is hereby stated that the expression "temporary releasable connection" is intended to cover connections that require a predetermined degree of force for separation. In other words, a simple location spigot such as found in wireless electric toothbrush chargers is not intended to be covered by the term "temporary releasable connection", since no particular force is required to separate the toothbrush from the charger. Embodiments of the present invention therefore combine a releasable physical connection with a wireless power transfer system in a counterintuitive way that is not suggested by the prior art.

Preferably, the power receiving device is portable. Examples of portable power receiving devices include mobile telephones, lap-top computers, and personal digital assistants (PDA).

Examples of relative positions and/or orientations in which the charging unit and device may be attached include:
Any position in one translational dimension.
Any position in an orthogonal translational dimension.
Any rotation about one plane.
Any rotation about a plane orthogonal to the first.
Any combination of the above.

It will be understood that the term "recharging" may also be taken to mean "powering" for devices which do not have substantial rechargeable batteries, and therefore can only operate while in proximity to the recharger, for example light bulbs, fans etc.

Preferably, the charging unit is capable of charging multiple types of device.

Preferably, the charging unit is capable of charging multiple devices simultaneously.

Preferably, the device is capable of being charged by multiple types of charging unit.

Advantageously, the connecting means comprises a means added to the surface of the device and/or the charging unit. Examples of this type of connecting means include hook-and-eye fasteners (such as Velcro™), suckers, reusable, self-adhesive glue (as used in, for example, Post-It™ notes) or high satiation/friction surfaces such as a rubbery or rough surface. The means may cover only a small portion of the surface, or for example a complete face, or the entire device and/or charging unit.

Alternatively or in addition, the connecting means may comprise a shaping of the surface of the device and/or the charging unit. Examples of the connecting means used in this embodiment of the invention include bumps, ridges or grooves on the surface of either the charging unit or the device. For example, the connecting means may comprise a plurality of projections on one surface and a plurality of corresponding holes on another surface, for example as used in Lego® building blocks. Alternatively, spiked systems such as those exemplified by Stickle-Bricks(R) or spikes with corresponding holes can be used as connecting means. Hook-and-eye shapings may also be used as connecting means.

Alternatively or in addition, the connecting means may comprise means added beneath the surface of the device and/or the charging unit, said means being capable of acting at a distance. Examples of the connecting means in this embodiment of the invention may include permanent magnets, and arrays of such, electromagnets, and arrays of such or possibly electrostatically-charged terminals.

Alternatively or in addition, only the charging unit, and not the device comprises a connecting means. In this embodiment, examples of the connecting means include pockets. For example, the charging unit may be positioned so that it hangs vertically on a wall and the connecting means of the charging unit may be multiple pockets to receive one or more devices.

Further examples of the connecting means of the charging unit may include elastic bands to strap down the device(s), or indentations or contours on the charging unit. Examples of such indentations or contours on the charging unit include a ridge designed to hold standard AA cells for example or a bowl shape indentation to retain a variety of differently-shaped devices.

In one embodiment, the connecting means may be adapted to enable the charging unit and the device to be mated in a large number of different relative orientations, for example, such that the possible relative location and rotation of the device and charging unit are quantized into so many possibilities that there is no limitation visible to the user. For example, the connecting means could be Velcro®, which would enable mating between the charging unit and the device to occur in almost any position and rotation relative to each another. Alternatively, the connecting means may be adapted to enable the charging unit and the device to be mated in a limited number of relative orientations only. For example, the connecting means may comprise a plurality of projections on one surface and a plurality of corresponding holes on another surface, such as Lego® building blocks, which may only allow mating between the charging unit and the device in a maximum of four possible rotations and at a finite number of discrete locations).

In particular, there may only be one possible relative orientation in which the device and charging unit may be mated together. For example, a manufacturer selling a device capable of being recharged by relatively large recharging surfaces may nevertheless choose to include with the device a small, low-cost recharging surface which precisely fits the device, and is retained to it, for example by 4 holes in the device and 4 corresponding bumps in the surface. Thus the user can "clip" the surface of the charging unit to the device in a manner similar to today's wired charging connections, but the device is capable of being used more flexibly with larger charging unit surfaces. In this case, the surface may be incorporated directly into a mains-powered charging unit, providing a low-cost "no wires" easy-travel solution onto which a device can be conveniently pressed.

The connecting means of the device may correspond to the connecting means of the charging unit, such that devices will attach to charging units, but not devices to devices nor charging units to charging units. An example of a connecting means of this embodiment is Velcro® which comes in "male" and "female" types which stick to each other but not to themselves. Thus, the connecting means of the device may be Velcro® of the male type, and the connecting means of the charging unit may be Velcro® of the female type.

Alternatively, the connecting means of the charging unit may be identical to the connecting means of the device. This embodiment will be capable of attaching to itself and may be used on all devices and charging units. An example is a reusable tacky adhesive such as the glue used in Post-It® notes. A potential advantage of this is in the case where a device is capable of performing the function of a charging unit to another device.

In a yet further embodiment, there may be several different classes of pairs of types of connecting means, with each pair class attaching only to the other of the pair. A potential advantage of this is in the case that not all charging units are capable of recharging all devices—a user can then immediately feel that a device is not "sticking" to a (or part of a) charging unit and will not be recharged by it.

In addition to the embodiments described above, the connecting means may in addition possess aesthetic or visual qualities to conveniently inform users that a device is capable of being recharged, or a charging unit is available to recharge, or if a certain (part of the) charging unit is more appropriate for charging a particular class of device in the manner described above.

Examples of these qualities include giving the connecting means:
- A specific reflective color (e.g. Pantone® 123)
- A specific emissive color (e.g. a bright red light)
- A fluorescent or luminous color
- A specific "sheen" (e.g. glittering metallic silver)
- A specific repeated pattern (e.g. triangles)
- A specific logo design or text (e.g. "Zap™")
- An outline of the area in which a device may receive power
- A texture, which may optionally be recognizable by touch alone (e.g. fuzzy)
- A material or combinations of the above.

These aesthetic qualities may even by used to inform users of the presence of devices or charging units in places where they would not otherwise suspect them, for example a charging unit embedded within part of a tabletop.

The aesthetic qualities may change their appearance or touch depending on the state of the device and/or the charging unit. For example the surface of a device and/or charging unit may change color when it is powered-on, or the device is in need of recharging, or is recharging, or is recharged, or is in need of attention (for example a mobile phone device receiving an incoming call).

The preferred features of the invention are applicable to all aspects of the invention and may be used in any possible combination.

Throughout the description and claims of this specification, the words "comprise" and "contain" and variations of the words, for example "comprising" and "comprises", mean "including but not limited to", and are not intended to (and do not) exclude other components, integers, moieties, additives or steps.

BRIEF DESCRIPTION OF THE DRAWINGS

For a better understanding of the present invention and to show it may be carried into effect, reference shall now be made, by way of example, to the accompanying drawings, in which.

DESCRIPTION OF THE PREFERRED EMBODIMENTS

Figure 3:
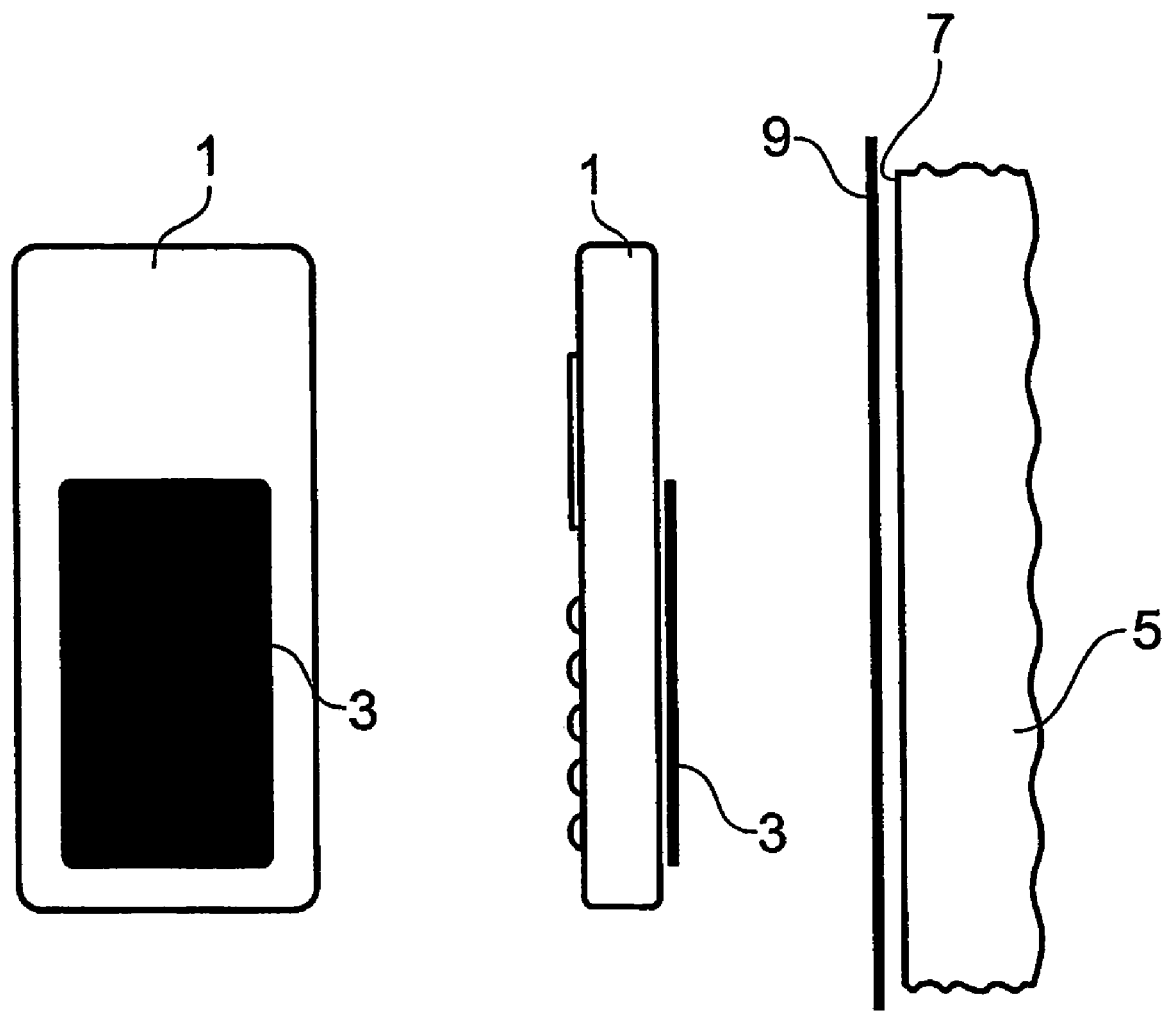
FIG. 3 shows an alternative embodiment of the present invention.

Referring to FIG. 3, there is shown a power receiving device 1, in this embodiment the device is a mobile phone. The mobile phone 1 has a connecting means 3 attached to the back of the phone. In this embodiment the connecting means 3 of the device 1 is a patch of self-adhesive Velcro® of the "male" type. This is black and slightly prickly, informing the user that the phone may be charged on a charging surface. FIG. 3 also shows a charging unit 5. In this embodiment the charging unit 5 is an inductive recharging pad. On the surface 7 of the pad 5 is attached a patch of self-adhesive Velcro® of the "female" type 9, which acts as the connecting means of the charging unit. This is black and slightly fuzzy, informing the user that the pad may charge devices.

To mate the phone 1 and the pad 5 temporarily, the user simply presses the phone 1 onto the pad 5 (or drops it, if the pad is below the phone) and the Velcro® 3, 9 holds the phone in place on the pad. The phone can be placed onto the pad in any orientation and in any position, and is held securely by the Velcro®. Once the phone and the pad are attached in this way, the phone can receive power from the pad and so can be recharged. When the phone 1 has been recharged fully, or before if desired, it can be removed from the pad 5 easily by the user at any time, simply by pulling it away. This disengages the Velcro® 3 from the Velcro® 9.

Figure 1:
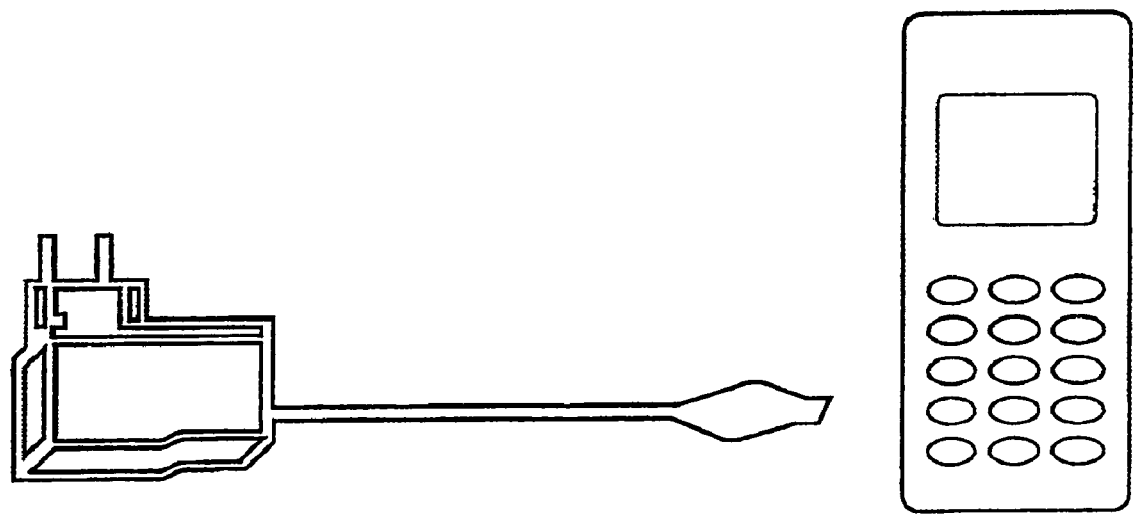
FIG. 1 shows an example of a prior art recharging connection.
Figure 2:
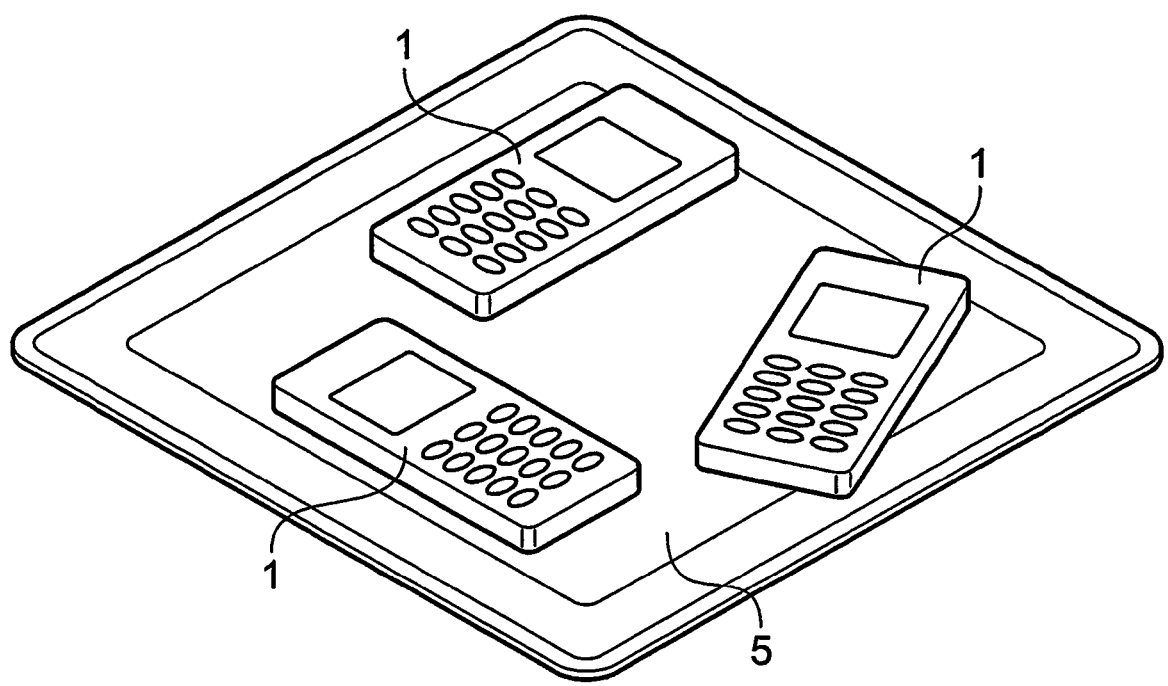
FIG. 2 shows an embodiment of the present invention.

FIG. 2 shows an alternative embodiment wherein a plurality of devices 1, (in this embodiment, mobile phones) are attached to a charging unit 5 (in this embodiment, a pad). FIG. 2 shows that, in this embodiment, the mobile phone 1 and the pad 5 can be mated at various different orientations to the each other and also the mobile phones can be positioned at different orientations relative to the other mobile phones 1.

The invention claimed is:

1. A portable electrical or electronic device adapted to receive power from a primary unit that has a power transfer surface and an inductive power supply which supplies power inductively,
    said device being separable from the primary unit and having an inductive power receiver adapted to receive power from the inductive power supply by inductive coupling when the device is placed on or in proximity to the power transfer surface,
    the device being arranged such that the device can be placed in any position along a line extending in one translational dimension across the power transfer surface to receive power inductively from the inductive power supply,
    and wherein the device comprises at least one attaching element comprising suckers, or a self-adhesive or rubbery surface, disposed on the power transfer surface which temporarily releasably attaches the device to the primary unit in any said position along said line such that the device is held on or in proximity to the power transfer surface,
    said attaching element(s) providing a non-gravitational force, acting to resist movement of the device away from the power transfer surface in a direction substantially orthogonal to that surface, when the device is attached to the primary unit in any said position along said line.

2. A device according to claim 1, wherein at least one said attaching element has one or more aesthetic or visual qualities to indicate to a user that the device is capable of receiving power inductively.

3. A device according to claim 1, wherein there are one or more classes of portable electrical or electronic device, and at least one said attaching element has one or more aesthetic or visual qualities to inform a user that the device belongs to a particular said class of device.

4. A portable electrical or electronic device adapted to receive power from a primary unit that has a power transfer surface and an inductive power supply which supplies power inductively,
    said device being separable from the primary unit and having an inductive power receiver adapted to receive power from the inductive power supply by inductive coupling when the device is placed on or in proximity to the power transfer surface,
    the device being arranged such that the device can be placed in any position within an uninterrupted two-dimensional area of the power transfer surface to receive power inductively from the inductive power supply, and wherein the device comprises at least one attaching element comprising suckers, or a self-adhesive or rubbery surface, disposed on the power transfer surface which temporarily releasably attaches the device to the primary unit in any said position within said area such that the device is held on or in proximity to the power transfer surface, said at least one attaching element providing a non-gravitational force, acting to resist movement of the device away from the power transfer surface in a direction substantially orthogonal to that surface, when the device is attached to the primary unit in any said position within said area.

5. A device according to claim 4, wherein at least one said attaching element has one or more aesthetic or visual qualities to indicate to a user that the device is capable of receiving power inductively.

6. A device according to claim 4, wherein there are one or more classes of portable electrical or electronic device, and at least one said attaching element has one or more aesthetic or visual qualities to inform a user that the device belongs to a particular said class of device.

* * * * *